United States Patent
Yoshida (10) Patent No.: US 7,963,217 B2
(45) Date of Patent: Jun. 21, 2011

(54) APPARATUS AND METHOD FOR PRODUCING DISPLAY PANEL

(75) Inventor: Tokuo Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 84 days.

(21) Appl. No.: 12/597,033

(22) PCT Filed: Mar. 17, 2008

(86) PCT No.: PCT/JP2008/000614
§ 371 (c)(1),
(2), (4) Date: Oct. 22, 2009

(87) PCT Pub. No.: WO2009/008111
PCT Pub. Date: Jan. 15, 2009

(65) Prior Publication Data
US 2010/0116155 A1    May 13, 2010

(30) Foreign Application Priority Data

Jul. 10, 2007  (JP) .................................. 2007-180507

(51) Int. Cl.
*B30B 13/00* (2006.01)
*B30B 5/02* (2006.01)
*B29C 53/04* (2006.01)

(52) U.S. Cl. ............ 100/35; 100/211; 100/295; 156/60; 156/245; 156/581; 425/417; 425/DIG. 29; 264/550

(58) Field of Classification Search ............ 100/35, 100/155 R, 156, 211, 269.04, 295; 156/1, 156/60, 212, 214, 242, 245, 349, 580, 581; 425/416, 417, DIG. 14, DIG. 29; 264/549, 550, 544, 545

See application file for complete search history.

(56) References Cited

U.S. PATENT DOCUMENTS

| 5,879,724 | A | * | 3/1999 | Sakamoto | 425/385 |
| 6,129,866 | A | * | 10/2000 | Hamanaka et al. | 264/1.7 |
| 6,615,711 | B2 | * | 9/2003 | Matsuzuki et al. | 100/218 |
| 2006/0060288 | A1 | * | 3/2006 | Maeda et al. | 156/163 |

FOREIGN PATENT DOCUMENTS

| JP | 59-140422 A | 8/1984 |
| JP | 62-238526 A | 10/1987 |
| JP | 03-073930 A | 3/1991 |
| JP | 10-268245 A | 10/1998 |
| JP | 2004-354468 A | 12/2004 |

OTHER PUBLICATIONS

Official Communication issued in International Patent Application No. PCT/JP2008/000614, mailed on May 13, 2008.

* cited by examiner

*Primary Examiner* — Jimmy T Nguyen
(74) *Attorney, Agent, or Firm* — Keating & Bennett, LLP (57) ABSTRACT

An apparatus for manufacturing a display panel includes a pair of pressing jigs respectively having pressing surfaces that overlap each other. A pair of film substrates, each having a display region defined thereon, are molded into a curved shape by holding the pair of film substrates between the respective pressing surfaces of the pair of pressing jigs so that the respective display regions overlap each other with a sealant, which is positioned around the display regions between the pair of film substrates, being interposed therebetween, and at least one pressing jig of the pair of pressing jigs has multiple pressing surfaces, which have different radii of curvature from each other, and are switchable with each other.

17 Claims, 6 Drawing Sheets

APPARATUS AND METHOD FOR PRODUCING DISPLAY PANEL

BACKGROUND OF THE INVENTION

1. Field of the Invention

The present invention relates to apparatuses and methods for manufacturing a display panel. More particularly, the present invention relates to apparatuses and methods for manufacturing a curved display panel formed by bonding a pair of substrates together and molding the bonded body into a curved shape.

2. Description of the Related Art

Liquid crystal display (LCD) panels are manufactured by bonding a pair of substrates together by a frame-shaped sealant, and enclosing a liquid crystal material between the substrates.

For example, Japanese Published Patent Application No. H03-73930 discloses a method for manufacturing an LCD panel, in which, in an assembly step of sealing a first substrate and a second substrate, which correspond to the pair of substrates described above, by a sealant with a predetermined gap therebetween, the first substrate and the second substrate are sealed while pressing these substrates with airbags using air pressure.

Incidentally, flexible display panels using flexible film substrates instead of conventionally used glass substrates have been developed in the fields of LCD panels and organic EL (electro luminescence) display panels.

Moreover, by taking advantage of the flexibility of film substrates, display panels molded in a curved shape have been recently proposed to obtain the panel shape according to the surface profile and the size of a panel installation space, and to improve the design.

For example, Japanese Published Patent Application No. S62-238526 discloses a manufacturing method of a curved LCD device in which a sealant between a pair of glass substrates of an LCD device is cured with the substrates being held under pressure between a male curved jig having a primary convex surface and a female curved jig having a primary concave surface corresponding to the convex surface.

However, when manufacturing a curved display panel by using the manufacturing method disclosed in Japanese Published Patent Application No. S62-238526, it is necessary to press a flat display panel by pressing jigs having a predetermined radius of curvature according to the model of the display panel, such as the male curved jig and the female curved jig. Thus, in order to change the radius of curvature of a display panel to be manufactured, it takes time to place pressing jigs by, for example, detaching pressing jigs corresponding to the previous model from a pressing apparatus, and then, attaching pressing jigs corresponding to the next model to the pressing apparatus, which can reduce production efficiency. Moreover, since special pressing jigs are required to be manufactured according to the radius of curvature of an LCD panel, a multiplicity of pressing jigs can be required for a plurality of radii of curvature, and the area that is occupied by the apparatus on the floor surface in order to secure the space for placing or storing the multiplicity of pressing jigs, that is, the footprint, can be increased.

SUMMARY OF THE INVENTION

In view of the above problems, preferred embodiments of the present invention greatly improve production efficiency, the footprint, and the apparatus cost in manufacturing of curved display panels.

According to a preferred embodiment of the present invention, at least one pressing jig of a pair of pressing jigs for molding a pair of film substrates into a curved shape by holding the pair of film substrates therebetween has a plurality of pressing surfaces, which have different radii of curvature from each other, and are switchable with each other.

More specifically, an apparatus for manufacturing a display panel according to a preferred embodiment of the present invention includes: a pair of pressing jigs respectively having pressing surfaces that overlap each other, wherein a pair of film substrates, each having a display region defined thereon, are molded into a curved shape by holding the pair of film substrates between the respective pressing surfaces of the pair of pressing jigs so that the respective display regions overlap each other with a sealant, which is positioned around the display regions between the pair of film substrates, being interposed therebetween, and at least one pressing jig of the pair of pressing jigs has multiple pressing surfaces, which have different radii of curvature from each other, and are switchable with each other.

According to the above structure, at least one pressing jig of the pair of pressing jigs for molding the pair of film substrates into a curved shape by holding the pair of film substrates therebetween has multiple pressing surfaces, and the multiple pressing surfaces have different radii of curvature from each other, and are switchable with each other. Thus, the radius of curvature of display panels to be manufactured can be changed by merely switching the pressing surface, which contacts the pair of film substrates, to a corresponding pressing surface. This eliminates the need to attach a pair of pressing jigs that are to be used, after detaching a pair of pressing jigs that have been used (e.g., the male curved jig and the female curved jig disclosed in Japanese Published Patent Application No. S62-238526), as in conventional examples, and the respective pressing surfaces of the pair of pressing jigs can be set at predetermined positions in a short period of time, whereby reduction in production efficiency is prevented. Moreover, no pressing jig is detached or attached every time the radius of curvature of display panels to be manufactured is changed. Thus, the footprint for placing or storing the pressing jigs is minimized. Moreover, since the pair of pressing jigs are adaptable to a plurality of radii of curvatures, the apparatus cost for the pressing jigs is greatly reduced. Thus, improvements in production efficiency, the footprint, and the apparatus cost can be provided in manufacturing of curved display panels.

In the one pressing jig having multiple pressing surfaces, each of the pressing surfaces may be formed as a concave surface.

According to the above structure, since each pressing surface of the one pressing jig having multiple pressing surfaces is formed as a concave surface, each pressing surface of the other pressing jig having a plurality of pressing surfaces or a single pressing surface is formed as a convex surface, and the pair of film substrates are held between the concave pressing surfaces, and the convex pressing surface, whereby the pair of film substrates are molded into a curved shape.

Moreover, since each pressing surface of the one pressing jig having multiple pressing surfaces is formed as a concave surface, the volume of the one pressing jig is reduced as compared to the case where each pressing surface is formed as a convex surface, whereby the weight of the pressing jigs is reduced.

Multiple pairs of pressing jigs may be positioned successively.

According to the above structure, since multiple pairs of pressing jigs are positioned successively, a plurality of molding units can be molded simultaneously by these pairs of pressing jigs.

The at least one pressing jig having multiple pressing surfaces may be configured so that a pressing surface that contacts the pair of film substrates is switched by rotation of the pressing jig.

According to the above structure, the pressing surface that contacts the pair of film substrates is specifically switched by rotating the pressing jig.

The other pressing jig, which does not have multiple pressing surfaces, may be provided so that the pressing surface thereof is deformable to a predetermined radius of curvature.

According to the above structure, the pressing surface of the other pressing jig, which does not have multiple pressing surfaces, is provided so as to be deformable to a predetermined radius of curvature corresponding to each pressing surface of one pressing jig having multiple pressing surfaces. Thus, the pair of film substrates are held between each pressing surface of one pressing jig and one deformable pressing surface of the other pressing jig, whereby the pair of film substrates are molded into a curved shape.

The pressing surface of the other pressing jig, which does not have multiple pressing surfaces, may be formed by a surface of an inflatable and deflatable airbag.

According to the above structure, by inflating the airbag of the other pressing jig, the pair of film substrates are held between each pressing surface of one pressing jig and one deformable pressing surface of the other pressing jig, which is formed by the surface of the airbag, whereby the pair of film substrates are molded into a curved shape.

The airbag may be made of a silicone rubber, and the apparatus may further include a wind-off roll and a wind-up roll for continuously passing a releasing film between the pressing surface formed by the airbag and the pair of film substrates.

According to the above structure, the releasing film, which is wound off from the wind-off roll, is passed between the pressing surface formed by the airbag and the pair of film substrates, and then, is wound up onto the wind-up roll, prevents the silicone rubber airbag from directly contacting the surface of the pair of film substrates. This prevents adhesion of the silicone rubber airbag to the surface of the pair of film substrates.

Multiple display regions may be defined at least along a longitudinal direction in each of the pair of film substrates, and the pair of film substrates may be continuously molded by a roll-to-roll method.

According to the above structure, the pair of film substrates can be continuously molded by a roll-to-roll method. This improves production efficiency of curved display panels, which are formed by the display regions that overlap each other in the pair of film substrates.

Multiple pairs of pressing jigs may be positioned successively, and each pair of pressing jigs may be arranged so as to be movable back and forth along a traveling direction of the pair of film substrates.

According to the above structure, since each pair of pressing jigs are arranged so as to be movable back and forth along the traveling direction of the pair of film substrates, the gap between adjacent pairs of pressing jigs can be adjusted.

The at least one pressing jig having multiple pressing surfaces may be transparent to UV light, and a UV lamp for curing the sealant may be provided on a side, which does not contact the pair of film substrates, of the at least one pressing jig having multiple pressing surfaces.

According to the above structure, the at least one pressing jig having multiple pressing surfaces is transparent to UV light. Thus, for example, in the case where the sealant provided between the pair of film substrates is made of a UV-curable resin, UV light from the UV lamp transmits through this pressing jig to the sealant, whereby the sealant is cured.

A light-shielding wall to prevent UV light from the UV lamp from leaking to outside may be arranged around the at least one pressing jig having multiple pressing surfaces.

According to the above structure, since the light-shielding wall is arranged around the at least one pressing jig having multiple pressing surfaces, UV radiation can be prevented from being applied to, e.g., the pair of film substrates and the like.

At least one pressing jig of the pair of pressing jigs may be arranged so as to be able to heat the sealant.

According to the above structure, at least one pressing jig of the pair of pressing jigs is arranged so as to be able to heat the sealant. Thus, for example, in the case where the sealant provided between the pair of film substrates is made of a thermosetting resin, heat from the pressing jig that contacts the surface of the pair of film substrates reaches the sealant, whereby the sealant is cured.

At least one pressing jig of the pair of pressing jigs may be made of a rigid body, the pressing surface of the pressing jig made of the rigid body may be covered by a silicone rubber, and the apparatus may further include a wind-off roll and a wind-up roll for continuously passing a releasing film between the pressing surface covered by the silicone rubber and the pair of film substrates.

According to the above structure, the pressing surface of the pressing jig made of the rigid body is covered by the silicone rubber, the sealant spreads more uniformly between the pair of film substrates without being affected by concave portions and convex portions on the substrate surface, as compared to the case where the pressing surface is not covered by the silicone rubber. Moreover, the releasing film, which is wound off from the wind-off roll, is passed between the pressing surface covered by the silicone rubber and the pair of film substrates, and then, is wound up onto the wind-up roll, prevents the pressing surface covered by the silicone rubber from directly contacting the surface of the pair of film substrates. This prevents adhesion of the pressing surface covered by the silicone rubber to the surface of the pair of film substrates.

At least one pressing jig of the pair of pressing jigs may be made of a rigid body, and the apparatus may further include a wind-off roll and a wind-up roll for continuously passing a cushioning film between the pressing surface of the pressing jig made of the rigid body and the pair of film substrates.

According to the above structure, the cushioning film, which is wound off from the wind-off roll, is passed between the pressing surface of the pressing jig made of the rigid body, and the pair of film substrates, and then, is wound up onto the wind-up roll, prevents the pressing surface made of the rigid body from directly contacting the surface of the pair of film substrates. This prevents generation of scratches to the surface of the pair of film substrates.

In a method for manufacturing a display panel according to another preferred embodiment of the present invention, a pair of film substrates, each having a display region defined thereon, are molded into a curved shape by holding the pair of film substrates between a pair of pressing jigs respectively having pressing surfaces that overlap each other, so that the respective display regions overlap each other with a sealant, which is positioned around the display regions between the pair of film substrates, being interposed therebetween. In this method, at least one pressing jig of the pair of pressing jigs has multiple pressing surfaces, which have different radii of curvature from each other, and are switchable with each other. The method includes: a first molding step of disposing one of the multiple pressing surfaces at a predetermined position, and molding the pair of film substrate by using the disposed pressing surface; and a second molding step of disposing a pressing surface, which is different from the pressing surface used in the first molding step, at a predetermined position, and molding the pair of film substrate by using the disposed pressing surface.

According to the above method, at least one pressing jig of the pair of pressing jigs for molding the pair of film substrates into a curved shape by holding the pair of film substrates therebetween has multiple pressing surfaces, and the multiple pressing surfaces have different radii of curvature from each other, and are switchable to each other. Thus, the radius of curvature of display panels to be manufactured can be changed between the first molding step and the second molding step by merely switching the pressing surface, which contacts the pair of film substrates, to a corresponding pressing surface. This eliminates the need to attach a pair of pressing jigs that are to be used, after detaching a pair of pressing jigs that have been used (e.g., the male curved jig and the female curved jig disclosed in Japanese Published Patent Application No. S62-238526), as in conventional examples, and the respective pressing surfaces of the pair of pressing jigs can be set at predetermined positions in a short period of time, whereby reduction in production efficiency is prevented. Moreover, no pressing jig is detached or attached every time the radius of curvature of display panels to be manufactured is changed. Thus, the footprint for placing or storing the pressing jigs is minimized. Moreover, since the pair of pressing jigs are adaptable to a plurality of radii of curvatures, the apparatus cost for the pressing jigs is greatly reduced. Thus, reduction in production efficiency, the footprint, and the apparatus cost are greatly improved in manufacturing of curved display panels.

The display regions may be respectively defined at least along a longitudinal direction in the pair of film substrates, and the pair of film substrates may be continuously molded by a roll-to-roll method.

According to the above method, the pair of film substrates can be continuously molded by a roll-to-roll method. This improves production efficiency of curved display panels, which are formed by the display regions that overlap each other in the pair of film substrates.

In the pair of film substrates, a slit or a half-cut groove may be formed along a width direction in every molding unit that is molded by the pair of molding jigs.

According to the above method, although the pair of film substrates tend to be irregularly bent and damaged in a region outside the pair of pressing jigs during molding, the slit or the half-cut groove formed in every molding unit in the pair of film substrates enables the pair of film substrates to be easily bent in the region outside the pair of pressing jigs, and the slits or the half-cut grooves serve as a base point of the bending, whereby damage to the pair of film substrates is prevented.

According to a preferred embodiment of the present invention, at least one pressing jig of a pair of pressing jigs for molding a pair of film substrates into a curved shape by holding the pair of film substrates therebetween has a plurality of pressing surfaces, and the pressing surfaces have different radii of curvature from each other, and are switchable with each other. Thus, significant improvements in production efficiency, the footprint, and the apparatus cost are achieved in manufacturing of curved display panels.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 2 is a side view of a pressing jig 17a of the curved surface bonding apparatus 20a.

FIG. 3 is a side view of a pressing jig 17b of another structure corresponding to the pressing jig 17a.

DETAILED DESCRIPTION OF THE PREFERRED EMBODIMENTS

Preferred embodiments of the present invention will be described in detail below with reference to the accompanying drawings. Note that the present invention is not limited to the following preferred embodiments.

First Preferred Embodiment

FIGS. 1 through 7B show a first preferred embodiment of an apparatus and a method for manufacturing a display panel according to the present invention. Note that, in the following preferred embodiments, a curved LCD panel having a liquid crystal material enclosed between a pair of film substrates is preferably described as an example of a display panel, and a curved surface bonding apparatus for molding an LCD panel into a curved shape and bonding the LCD panel is described as the apparatus for manufacturing a display panel.

Figure 1:
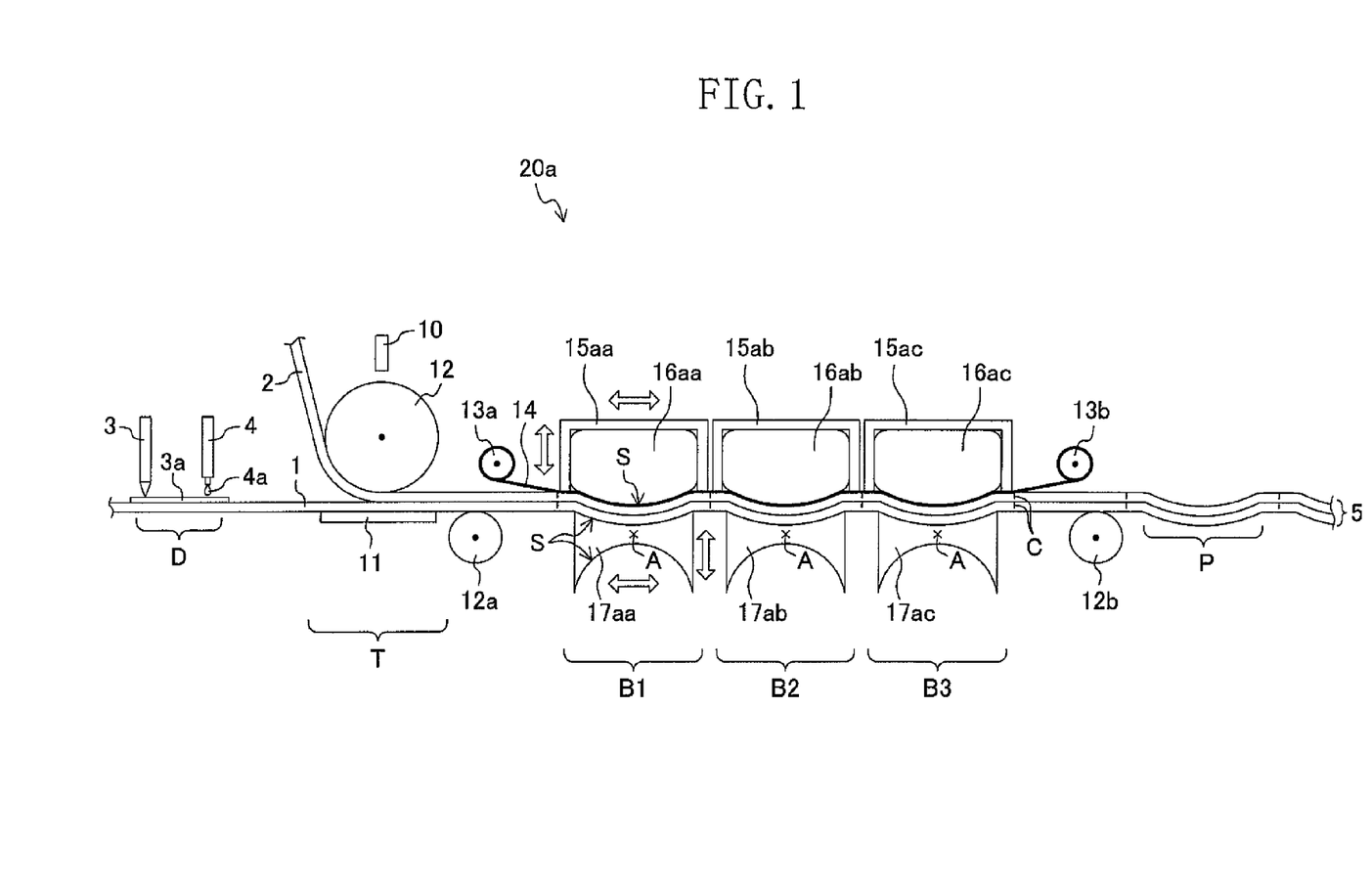
FIG. 1 is a side view of a curved surface bonding apparatus 20a according to a first preferred embodiment of the present invention.

FIG. 1 is a side view of a curved surface bonding apparatus 20a of the present preferred embodiment.

First, a pair of film substrates to be bonded by the curved surface bonding apparatus 20a, that is, a TFT (Thin Film Transistor) film substrate 1 and a CF (Color Filter) film substrate 2, will be described.

Figure 4:
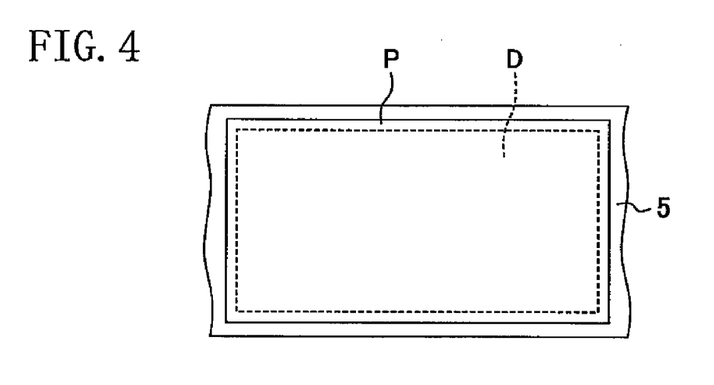
FIG. 4 is a top view of a bonded body 5 for manufacturing large size LCD panels P.
Figure 5:
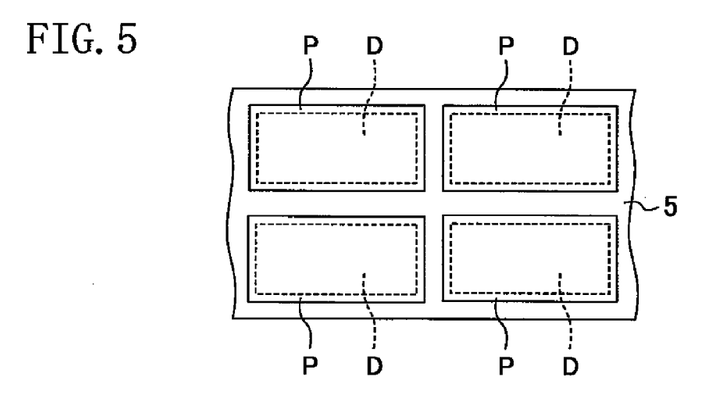
FIG. 5 is a top view of a bonded body 5 for manufacturing medium size LCD panels P.
Figure 6:
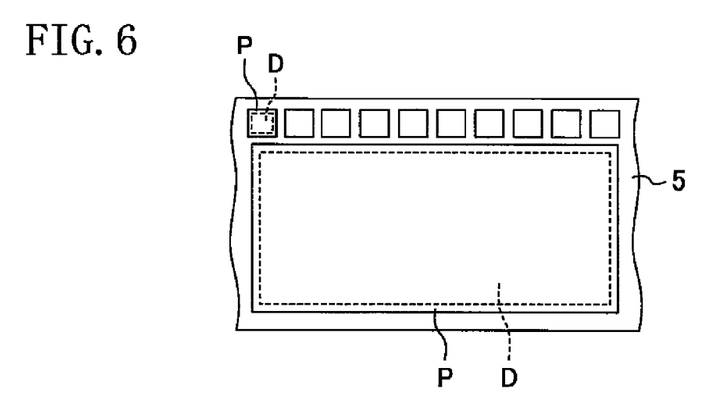
FIG. 6 is a top view of a bonded body 5 for simultaneously manufacturing large and small size LCD panels P.

A plurality of display regions D are defined at least along the longitudinal direction in the TFT film substrate 1 and the CF film substrate 2 (see FIGS. 4 through 6). FIGS. 4 through 6 are top views showing one molding unit of a bonded body 5 of the TFT film substrate 1 and the CF film substrate 2. More specifically, in FIG. 4, display regions D of 37-inch LCD panels P are defined in one row along the longitudinal direction in the bonded body 5 having a width of about 500 mm, for example. Moreover, in FIG. 5, display regions D of 18-inch LCD panels P are defined in two rows along the longitudinal direction (in a matrix pattern along the longitudinal direction and the width direction) in the bonded body 5 having a width of about 500 mm, for example. Moreover, in FIG. 6, display regions D of 32-inch LCD panels P are defined in one row along the longitudinal direction in the bonded body 5 having a width of about 500 mm, for example, and display regions D of 2.55-inch LCD panels P are defined in one row along the longitudinal direction in a lateral space thereof.

Moreover, as shown in FIG. 1, a slit or a half-cut groove C is formed along the substrate width direction in every molding unit, that is, between adjacent molding units, in the TFT film substrate 1 and the CF film substrate 2.

Each display region D of the TFT film substrate 1 includes, for example, a plurality of gate lines extending parallel to each other, a plurality of source lines extending parallel to each other in a direction perpendicular to the gate lines, a plurality of TFTs provided at each intersection of the gate lines and the source lines as switching devices, and a plurality of pixel electrodes provided respectively corresponding to the TFTs, and thus, has a structure of a so-called active matrix substrate.

Each display region D of the CF film substrate 2 includes, for example, a black matrix provided in a grid pattern, colored layers of R, G, and B provided between black matrix grid lines, and a common electrode arranged so as to cover the black matrix and the colored layers, and thus, has a structure of a so-called counter substrate.

As shown in FIG. 1, the curved surface bonding apparatus 20a arranged to bond the TFT film substrate 1 and the CF film substrate 2 which have the above structure includes: a seal dispenser 3 arranged to apply and draw a sealant 3a on the TFT film substrate 1; a liquid crystal dispenser 4 arranged to drop a liquid crystal material 4a to the TFT film substrate 1; a temporary bonding unit T arranged to temporarily bond the TFT film substrate 1, having the sealant 3a drawn thereon by the seal dispenser 3 and having the liquid crystal material 4a dropped thereon by the liquid crystal dispenser 4, and the CF film substrate 2 together; a first main bonding unit B1, a second main bonding unit B2, and a third main bonding unit B3 arranged to mold the TFT film substrate 1 and the CF film substrate 2, which have been temporarily bonded together by the temporary bonding unit T, into a curved shape, and to bond the TFT film substrate 1 and the CF film substrate 2 together; a transfer roll 12a arranged to transfer the TFT film substrate 1 and the CF film substrate 2, which have been temporarily bonded together by the temporary bonding unit T, into the main bonding units B1 through B3; and a transfer roll 12b arranged to transfer the bonded body 5, bonded by the main bonding units B1 through B3, to the next step. Note that the temporary bonding unit T and the main bonding units B1 through B3 are configured so as to bond the TFT film substrate 1 and the CF film substrate 2 in a vacuum atmosphere.

The seal dispenser 3 is filled with a thermosetting sealant 3a, and is configured to discharge the sealant 3a to each display region D of the TFT film substrate 1 to draw the sealant 3a in a frame shape.

The liquid crystal dispenser 4 is filled with the liquid crystal material 4a, and is configured to discharge, by dropping, a predetermined amount of liquid crystal material 4a to a region inside the frame-shaped sealant 3a formed in each display region D of the TFT film substrate 1.

The temporary bonding unit T preferably includes: a substrate stage 11 arranged to hold every molding unit of the TFT film substrate 1 from underneath; a bonding roll 12 arranged so that its peripheral wall contacts the surface of the substrate stage 11 with the TFT film substrate 1 and the CF film substrate 2 interposed therebetween; and alignment cameras 10 provided above the bonding roll 12 on both lateral sides thereof and arranged to detect alignment marks formed in advance on the TFT film substrate 1 and the CF film substrate 2. The temporary bonding unit T is configured to detect each alignment mark formed on the TFT film substrate 1 and the CF film substrate 2 by the alignment cameras 10, thereby adjusting the respective feeding speeds of the TFT film substrate 1 and the CF film substrate 2, and the like to align the TFT film substrate 1 and the CF film substrate 2 so that their respective display regions D overlap each other.

The alignment cameras 10 preferably are CCD (charge-coupled device) cameras, for example, or the like.

Each main bonding unit B1 through B3 preferably includes: the other pressing jig, which includes a chamber wall 15aa through 15ac formed in a box shape having no bottom, and an airbag 16aa through 16ac provided inside the chamber wall 15aa through 15ac so as to be inflatable and deflatable; and a concave pressing jig 17aa through 17ac provided as one pressing jig under the airbag 16aa through 16ac, where one pressing jig and the other pressing jig define a pair of pressing jigs.

Figure 2:
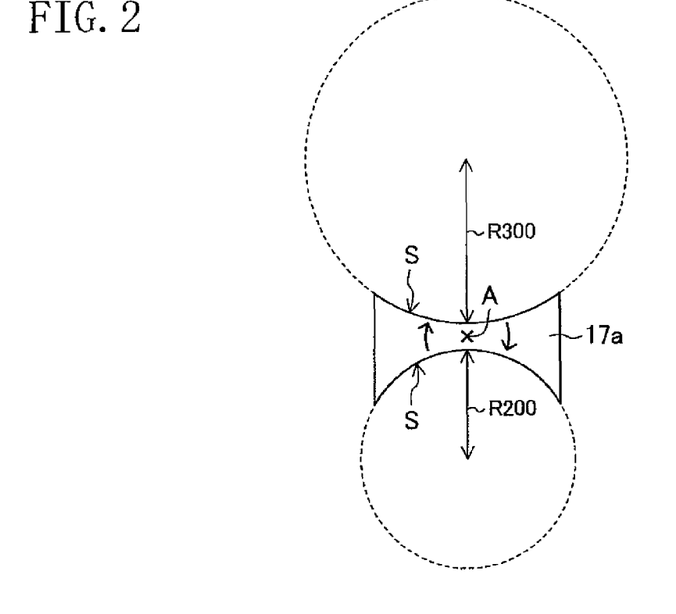
Figure 3:
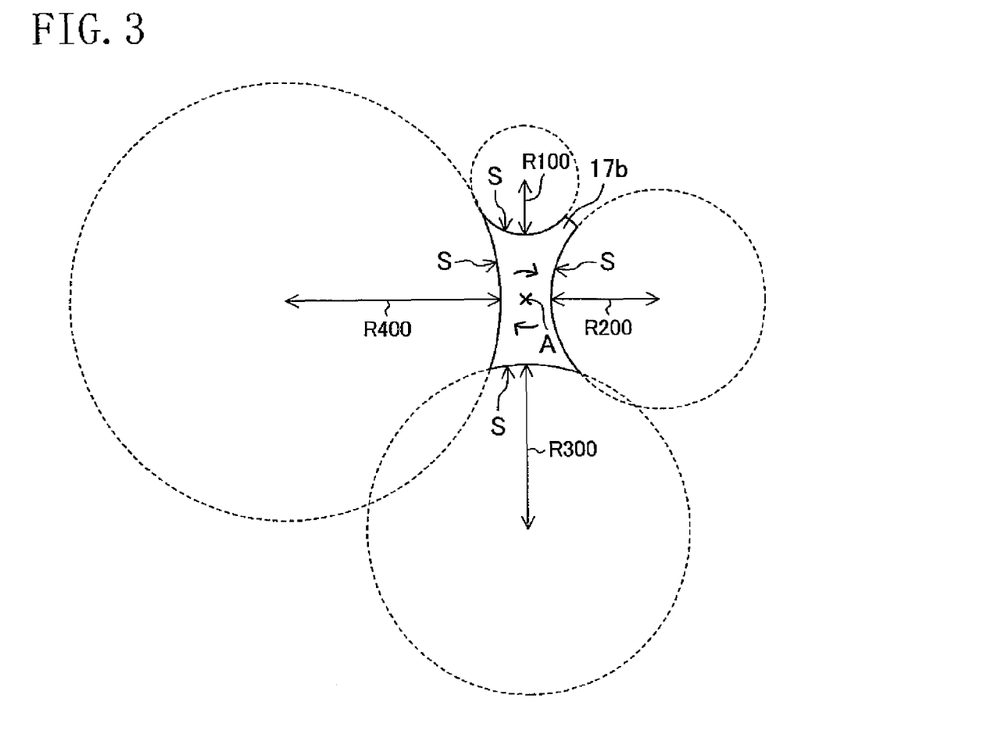

Each concave pressing jig 17aa through 17ac (17a) is formed by a rigid body such as aluminum or ceramics, and as shown in FIG. 2, has a pressing surface S of R200 having a radius of curvature of about 200 mm, for example, and a pressing surface S of R300 having a radius of curvature of about 300 mm, for example, and rotates about a rotation axis A so that the pressing surface S that contacts the TFT film substrate 1 is switchable between these pressing surfaces S. FIG. 2 is a side view of the concave pressing jig 17a of the curved surface bonding apparatus 20a. Note that FIG. 3 is a side view of a concave pressing jig 17b of another structure corresponding to the concave pressing jig 17a. More specifically, the concave pressing jig 17b has a pressing surface S of R100 having a radius of curvature of about 100 mm, for example, a pressing surface S of R200 having a radius of curvature of about 200 mm, for example, a pressing surface S of R300 having a radius of curvature of about 300 mm, for example, and a pressing surface S of R400 having a radius of curvature of about 400 mm, for example.

Moreover, each concave pressing jig 17aa through 17ac is arranged so as to move towards and away from the TFT film substrate 1 (and the CF film substrate 2), and so as to be movable back and forth along the traveling direction of the TFT film substrate 1 and the CF film substrate 2.

Moreover, each concave pressing jig 17aa through 17ac is arranged so as to be able to heat the sealant 3a between the TFT film substrate 1 and the CF film substrate 2 by an internal or external heater or the like.

Each airbag 16aa through 16ac is made of a silicone rubber or the like, and is provided so as to be deformable to a predetermined radius of curvature corresponding to each pressing surface S of each concave pressing jig 17aa through 17ac having two pressing surfaces S.

Each chamber wall 15aa through 15ac is arranged so as to move towards and away from (the TFT film substrate 1 and) the CF film substrate 2, and so as to be movable back and forth along the traveling direction of the TFT film substrate 1 and the CF film substrate 2.

A releasing film 14 such as a Teflon (registered trademark) film, which is wound off from a wind-off roll 13a, and then, is wound up onto a wind-up roll 13b, is interposed between the pressing surface S of each airbag 16aa through 16ac and the CF film substrate 2.

Next, a method for manufacturing an LCD panel P by using the curved surface bonding apparatus 20a of the above structure will be described. Note that the manufacturing method of an LCD panel P of the present preferred embodiment preferably includes a preparing step, a seal forming step, a liquid crystal dropping step, a temporary bonding step, and a main bonding step (a first molding step and a second molding step).
Preparing Step TFTs, pixel electrodes, and the like are formed by a roll-to-roll method or the like on, e.g., a polyimide film of about 500 mm wide, about 60 m long, and about 100 μm thick, for example, to form a plurality of display regions D. Similarly, a color filter, a common electrode, and the like are formed by a roll-to-roll method or the like on, e.g., a polyimide film of about 500 mm wide, about 60 m long, and about 100 μm thick, for example, to form a plurality of display regions D.

Moreover, a polyimide film is printed on each polyimide film having the display regions D formed therein, and then, a baking process and an alignment process are performed to form an alignment film, thereby fabricating a TFT film substrate 1 and a CF film substrate 2.

Seal Forming Step

A thermosetting epoxy resin or the like is drawn on the TFT film substrate 1 by using the seal dispenser 3, thereby forming a frame-shaped sealant 3a in each display region D. Then, an ultraviolet (UV)-curable epoxy resin or the like is applied to a region outside the sealant 3a to form a pair of temporary bonding seals 3b (see FIG. 7(b)).

Liquid Crystal Dropping Step

A liquid crystal material 4a is dropped to a region inside each sealant 3a of the TFT film substrate 1 by using the liquid crystal dispenser 4.

Temporary Bonding Step

Figure 7A:
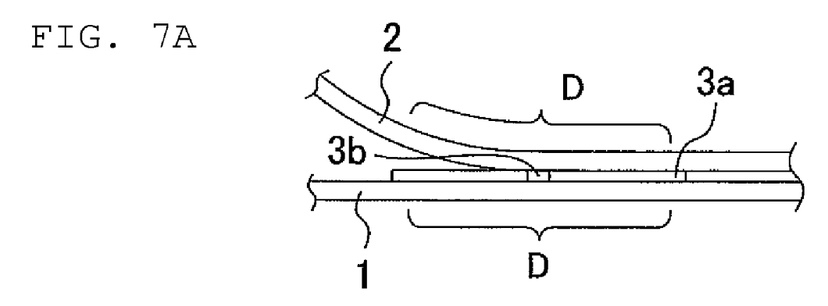
FIG. 7A is a side view illustrating a temporary bonding step.
Figure 7B:
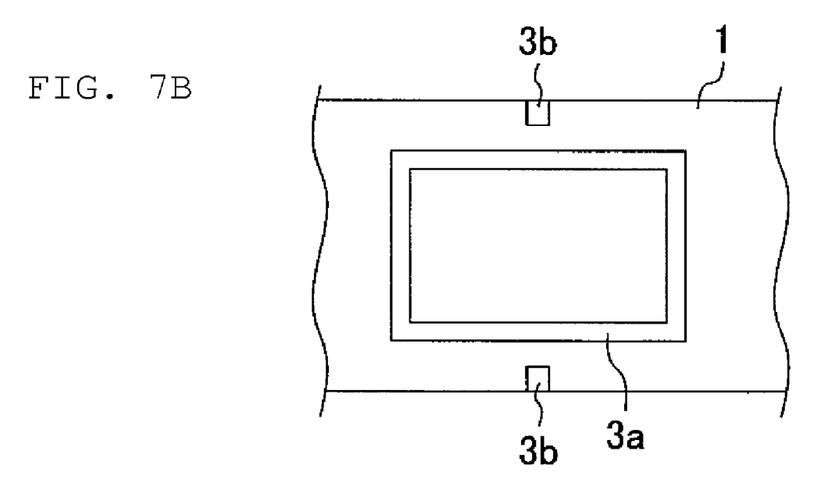
FIG. 7B is a top view of a TFT film substrate 1 in this step.

As shown in FIG. 7A, by using the temporary bonding unit T, the TFT film substrate 1 and the CF film substrate 2 are aligned so that the respective display regions D of the TFT film substrate 1 and the CF film substrate 2 overlap each other, and then, the temporary bonding seals 3b are cured to temporarily bond the substrates 1 and 2 together. FIG. 7A is a side view illustrating the step of temporarily bonding the TFT film substrate 1 and the CF film substrate 2 together, and FIG. 7B is a top view showing the TFT film substrate 1 in this step. Note that, since the TFT film substrate 1 and the CF film substrate 2 are bonded together by the temporary bonding seals 3b, displacement of the display regions D can be prevented when transferring the TFT film substrate 1 and the CF film substrate 2 to the main bonding units B1 through B3, and also, the process is less likely to be affected even if the film substrates slide along the longitudinal direction when molding the TFT film substrate 1 and the CF film substrate 2 into a curved shape in each main bonding unit B1 through B3.

Main Bonding Step (First Molding Step)

First, for example, the concave pressing jigs 17aa through 17ac are rotated about the rotation axis A to position their respective pressing surfaces S of the radius of curvature R300 on the upper side.

Then, the TFT film substrate 1 and the CF film substrate 2, which have been temporarily bonded together by the temporary bonding unit T, are transferred into the main bonding units B1 through B3, and after the tip thereof reaches the transfer roll 12b, the chamber walls 15aa through 15ac are lowered until the lower surface of each chamber wall 15aa through 15ac slightly touches the surface of the CF film substrate 2 with the releasing film 14 interposed therebetween.

Then, the concave pressing jigs 17aa through 17ac are lifted to bring their respective pressing surfaces S of the radius of curvature R300 into contact with the TFT film substrate 1, and then, air is supplied into the airbags 16aa through 16ac of the chamber walls 15aa through 15ac to inflate the airbags 16aa through 16ac, thereby bringing the pressing surface S of each airbag 16aa through 16ac into contact with the CF film substrate 2 (see FIG. 1). At this time, the pressure of the airbags 16aa through 16ac is, e.g., about 88.3 kPa. Then, the concave pressing jigs 17aa through 17ac are heated to about 200° C. for about 30 minutes, for example, to heat and cure the sealant 3a between the TFT film substrate 1 and the CF film substrate 2.

Thereafter, the concave pressing jigs 17aa through 17ac are lowered, the airbags 16aa through 16ac are deflated, and the chamber walls 15aa through 15ac are lifted. Then, the TFT film substrate 1 and the CF film substrate 2 which have been molded into a curved shape, that is, the bonded body 5, is transferred out of the main bonding units B1 through B3. Then, the molded bonded body 5 is cut into individual display regions D, whereby curved LCD panels P having a radius of curvature of 300 mm can be manufactured.

Main Bonding Step (Second Molding Step)

Then, the concave pressing jigs 17aa through 17ac are rotated about the rotation axis A by 180° to position their respective pressing surfaces S of the radius of curvature 8200 on the upper side.

Then, the chamber walls 15aa through 15ac are lowered until the lower surface of each chamber wall 15aa through 15ac slightly touches the surface of the CF film substrate 2 with the releasing film 14 interposed therebetween.

Then, the concave pressing jigs 17aa through 17ac are lifted to bring their respective pressing surfaces S of the radius of curvature 8200 into contact with the TFT film substrate 1, and then, air is supplied into the airbags 16aa through 16ac of the chamber walls 15aa through 15ac to inflate the airbags 16aa through 16ac, thereby bringing the pressing surface S of each airbag 16aa through 16ac into contact with the CF film substrate 2. Then, the concave pressing jigs 17aa through 17ac are heated to about 200° C. for about 30 minutes, for example, to cure the sealant 3a between the TFT film substrate 1 and the CF film substrate 2.

Thereafter, the concave pressing jigs 17aa through 17ac are lowered, the airbags 16aa through 16ac are deflated, and the chamber walls 15aa through 15ac are lifted. Then, the bonded body 5, which has been molded into a curved shape, is transferred out of the main bonding units B1 through B3. Then, the molded bonded body 5 is cut into individual display regions D, whereby curved LCD panels P having a radius of curvature of about 200 mm, for example, can be manufactured.

As described above, according to the curved surface bonding apparatus 20a of the present preferred embodiment, each concave pressing jig 17aa through 17ac for holding and molding the TFT film substrate 1 and the CF film substrate 2 into a curved shape has two pressing surfaces S, where the two pressing surfaces S have different radii of curvature from each other, and so as to be switchable to each other. Thus, the radius of curvature of LCD panels P to be manufactured can be changed by merely switching the pressing surface S, which contacts the TFT film substrate 1 and the CF film substrate 2, to a corresponding pressing surface S. Thus, it is not necessary to attach a pair of pressing jigs that are to be used, after detaching a pair of pressing jigs that have been used, as in conventional examples, and each pressing surface S of the concave pressing jigs 17aa through 17ac can be set at a predetermined position in a short period of time, whereby production efficiency is greatly increased. Moreover, no pressing jig is detached or attached every time the radius of curvature of LCD panels P to be manufactured is changed. Thus, the footprint for placing or storing the pressing jigs can be minimized. Moreover, since each main bonding unit B1 through B3 (each concave pressing jig 17aa through 17ac, and each airbag 16aa through 16ac) is adaptable to two radii of curvatures, the apparatus cost for the pressing jigs is greatly reduced. Thus, significant improvements in production efficiency, the footprint, and the apparatus cost are achieved in manufacturing of curved LCD panels.

Moreover, according to the curved surface bonding apparatus 20a of the present preferred embodiment, since each pressing surface S of each concave pressing jig 17aa through 17ac having two pressing surfaces S is formed as a concave surface, the volume of the pressing jigs is reduced as compared to the case where each pressing surface is formed as a convex surface, whereby the weight of the pressing jigs can be reduced.

Moreover, according to the curved surface bonding apparatus 20a of the present preferred embodiment, since the main bonding units B1 through B3 are positioned successively, a plurality of molding units can be simultaneously molded by the main bonding units B1 through B3.

Moreover, according to the curved surface bonding apparatus 20a of the present preferred embodiment, the pressing surface S of the other pressing jig is formed by the surface of each inflatable and deflatable airbag 16aa through 16ac, and is provided so as to be deformable into a predetermined radius of curvature corresponding to each pressing surface S of each concave pressing jig 17aa through 17ac having two pressing surfaces S. Thus, the TFT film substrate 1 and the CF film substrate 2 can be molded into a curved shape by holding these substrates between each pressing surface S of each concave pressing jig 17aa through 17ac and one deformable pressing surface S of each airbag 16aa through 16ac.

Moreover, according to the curved surface bonding apparatus 20a of the present preferred embodiment, the releasing film 14, which is wound off from the wind-off roll 13a, is passed between each pressing surface S of each airbag 16aa through 16ac, and (the TFT film substrate 1 and) the CF film substrate 2, and then, is wound up onto the wind-up roll 13b, prevents the silicone rubber airbags 16aa through 16ac from directly contacting the surfaces of the TFT film substrate 1 and the CF film substrate 2. This can prevent adhesion of the silicone rubber airbags 16aa through 16ac to the surfaces of the TFT film substrate 1 and the CF film substrate 2.

Moreover, according to the curved surface bonding apparatus 20a of the present preferred embodiment, the TFT film substrate 1 and the CF film substrate 2 can be continuously molded by a roll-to-roll method. This can improve production efficiency of curved LCD panels P, which are formed by the display regions D that overlap each other in the TFT film substrate 1 and the CF film substrate 2.

Moreover, according to the curved surface bonding apparatus 20a of the present preferred embodiment, since the main bonding units B1 through B3 (the concave pressing jigs 17aa through 17ac, and the airbags 16aa through 16ac) are arranged so as to be movable back and forth along the traveling direction of the TFT film substrate 1 and the CF film substrate 2, the gap between adjacent main bonding units B1 through B3 can be adjusted as appropriate.

Moreover, according to the curved surface bonding apparatus 20a of the present preferred embodiment, the curved pressing jigs 17aa through 17ac are arranged so as to be able to heat the sealant 3a. Thus, the heat from the concave pressing jigs 17aa through 17ac that contact the TFT film substrate 1 is transmitted to the thermosetting sealant 3a, whereby the sealant 3a can be cured.

Moreover, according to the manufacturing method of the present preferred embodiment, the slit or the half-cut groove C is formed in every molding unit in the TFT film substrate 1 and the CF film substrate 2. Thus, the TFT film substrate 1 and the CF film substrate 2 are easily bent in a region outside each main bonding unit B1 through B3, where the slits or the half-cut grooves C serve as a base point of the bending, whereby damage to the TFT film substrate 1 and the CF film substrate 2 can be prevented.

Second Preferred Embodiment

Figure 8:
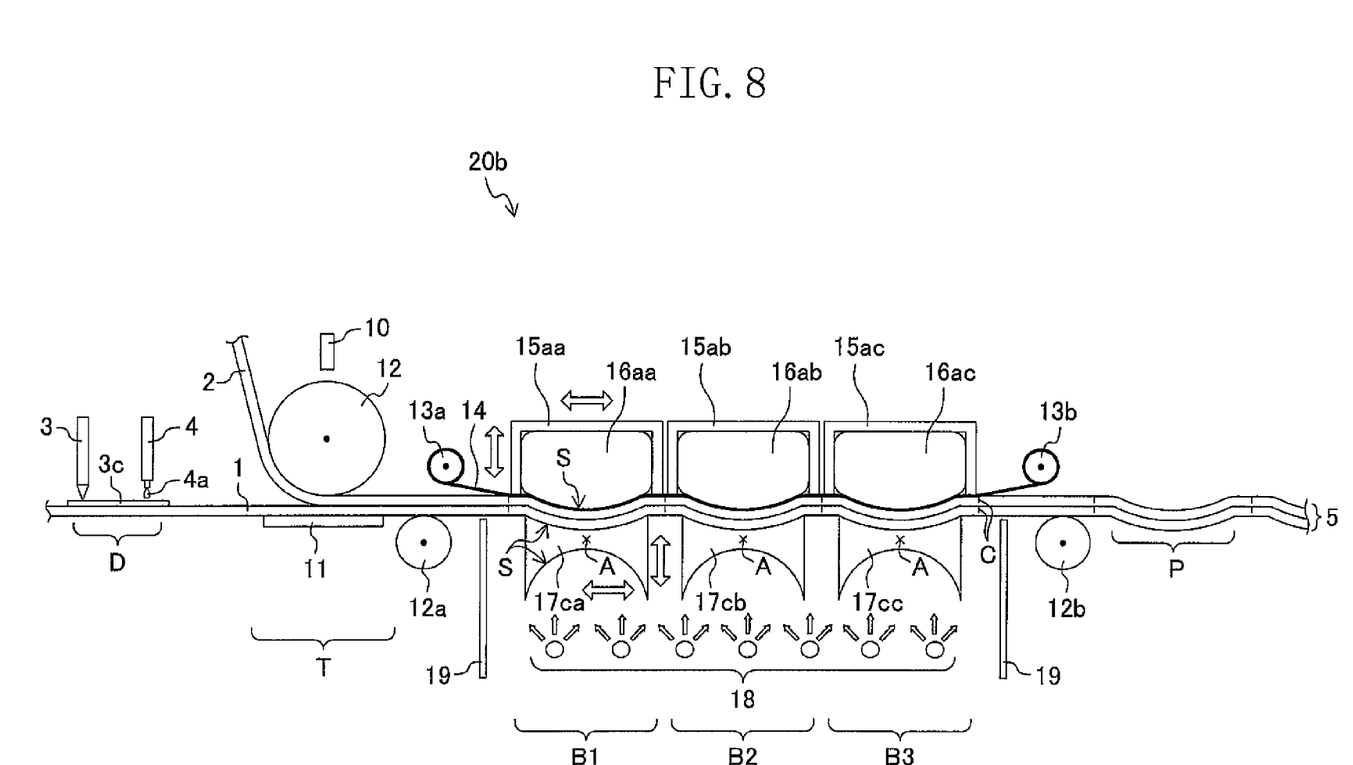
FIG. 8 is a side view of a curved surface bonding apparatus 20b according to a second preferred embodiment of the present invention.

FIG. 8 is a side view of a curved surface bonding apparatus 20b of the present preferred embodiment. Note that, in the following preferred embodiments, the same elements as those of FIGS. 1 through 7 are denoted with the same reference characters, and detailed description thereof will be omitted.

As shown in FIG. 8, like the curved surface bonding apparatus 20a of the first preferred embodiment, the curved surface bonding apparatus 20b includes: a seal dispenser 3 arranged to draw a sealant 3a on a TFT film substrate 1; a liquid crystal dispenser 4 arranged to drop a liquid crystal material 4a to the TFT film substrate 1; a temporary bonding unit T arranged to temporarily bond the TFT film substrate 1, having the sealant 3a drawn thereon by the seal dispenser 3 and having the liquid crystal material 4a dropped thereon by the liquid crystal dispenser 4, and a CF film substrate 2 together; main bonding units B1 through B3 arranged to mold the TFT film substrate 1 and the CF film substrate 2, which have been temporarily bonded together by the temporary bonding unit T, into a curved shape, and to bond the TFT film substrate 1 and the CF film substrate 2 together; a transfer roll 12a arranged to transfer the TFT film substrate 1 and the CF film substrate 2, which have been temporarily bonded together by the temporary bonding unit T, into the main bonding units B1 through B3; and a transfer roll 12b arranged to transfer the bonded body 5, bonded by the main bonding units B1 through B3, to the next step.

The seal dispenser 3 is filled with a UV-curable sealant 3c, and is configured to discharge the sealant 3c to each display region D of the TFT film substrate 1 to draw the sealant 3c in a frame shape. Note that the temporary seals 3b described in the first preferred embodiment may be formed by the seal dispenser 3.

Each main bonding unit B1 through B3 preferably includes: the other pressing jig, which includes a chamber wall 15aa through 15ac formed in a box shape having no bottom, and an airbag 16aa through 16ac provided inside the chamber wall 15aa through 15ac so as to be inflatable and deflatable; and a concave pressing jig 17ca through 17cc provided as one pressing jig under the airbag 16aa through 16ac; and a plurality of UV lamps 18 provided under the concave pressing jigs 17ca through 17cc, where one pressing jig and the other pressing jig define a pair of pressing jigs. Moreover, light-shielding walls 19 to prevent UV light from the UV lamps 18 from leaking to the outside are arranged on the carry-in side of the first main bonding unit B1 and the carry-out side of the third main bonding unit B3, respectively.

Each concave pressing jig 17ca through 17cc is preferably transparent and made of an acrylic resin, quartz glass, or the like, and as shown in FIG. 8, has a pressing surface S having a radius of curvature of about 200 mm, for example, and a pressing surface S having a radius of curvature of about 300 mm, for example, and rotates about a rotation axis A so that the pressing surface S that contacts the TFT film substrate 1 is switchable between these pressing surfaces S.

A method for manufacturing an LCD panel P by using the curved surface bonding apparatus 20b of the above structure is the same as that of the first preferred embodiment except that the sealant (3c) is cured by UV light instead of the heat in the main bonding step of the first preferred embodiment. Thus, detailed description thereof will be omitted.

According to the curved surface bonding apparatus 20b of the present preferred embodiment, significant improvements in production efficiency, the footprint, and the apparatus cost are achieved in manufacturing of curved LCD panels, as in the first preferred embodiment. Moreover, since the concave pressing jigs 17ca through 17cc, each having two pressing surfaces S, are transparent to UV light, UV light from the UV lamps 18 transmits through the concave pressing jigs 17ca through 17cc to the UV-curable sealant 3c, whereby the sealant 3c can be cured.

Moreover, according to the curved surface bonding apparatus 20b of the present preferred embodiment, the light-shielding walls 19 are arranged around the concave pressing jigs 17ca through 17cc each having two pressing surfaces S. Thus, UV radiation to, e.g., the TFT film substrate 1, the CF film substrate 2, and the like before molding can be prevented.

Third Preferred Embodiment

Figure 9:
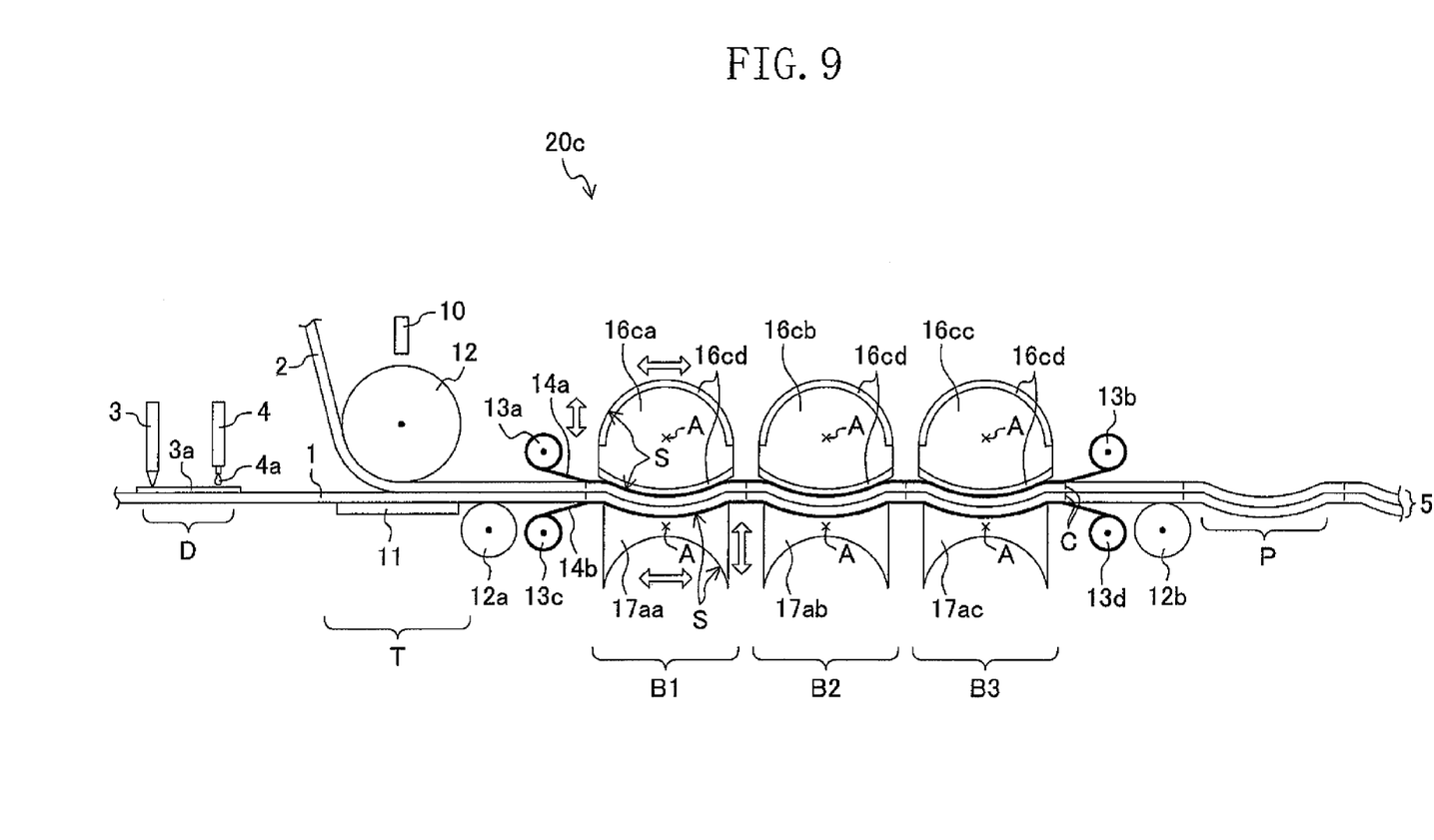
FIG. 9 is a side view of a curved surface bonding apparatus 20c according to a third preferred embodiment of the present invention.

FIG. 9 is a side view of a curved surface bonding apparatus 20c of the present preferred embodiment.

As shown in FIG. 9, like the curved surface bonding apparatuses 20a and 20b of the first and second preferred embodiments, the curved surface bonding apparatus 20c preferably includes: a seal dispenser 3 arranged to draw a sealant 3a on a TFT film substrate 1; a liquid crystal dispenser 4 arranged to drop a liquid crystal material 4a to the TFT film substrate 1; a temporary bonding unit T arranged to temporarily bond the TFT film substrate 1, having the sealant 3a drawn thereon by the seal dispenser 3 and having the liquid crystal material 4a dropped thereon by the liquid crystal dispenser 4, and a CF film substrate 2 together; main bonding units B1 through B3 arranged to mold the TFT film substrate 1 and the CF film substrate 2, which have been temporarily bonded together by the temporary bonding unit T, into a curved shape, and to bond the TFT film substrate 1 and the CF film substrate 2 together; a transfer roll 12a for transferring the TFT film substrate 1 and the CF film substrate 2, which have been temporarily bonded together by the temporary bonding unit T, into the main bonding units B1 through B3; and a transfer roll 12b arranged to transfer the bonded body 5, bonded by the main bonding units B1 through B3, to the next step.

Each main bonding unit B1 through B3 preferably includes a convex pressing jig 16ca through 16cc provided as the other pressing jig, and a concave pressing jig 17aa through 17ac provided as one pressing jig under the convex pressing jig 16ca through 16cc, where the convex pressing jig 16ca through 16cc and the concave pressing jig 17aa through 17ac define a pair of pressing jigs.

Each convex pressing jig 16ca through 16cc is formed by a rigid body such as aluminum or ceramics, and as shown in FIG. 9, has a pressing surface S of 8200 having a radius of curvature of about 200 mm, for example, and a pressing surface S of R300 having a radius of curvature of about 300 mm, for example, and rotates about a rotation axis A so that the pressing surface S that contacts the CF film substrate 2 is switchable between these pressing surfaces S.

The two pressing surfaces S of each convex pressing jig 16ca through 16cc are covered by silicone rubbers 16cd.

Moreover, each convex pressing jig 16ca through 16cc is arranged so as to move towards and away from (the TFT film substrate 1 and) the CF film substrate 2, and so as to be movable back and forth along the traveling direction of the TFT film substrate 1 and the CF film substrate 2.

Moreover, each convex pressing jig 16ca through 16cc is arranged so as to be able to heat the sealant 3a between the TFT film substrate 1 and the CF film substrate 2 by an internal or external heater or the like.

A releasing film 14a such as a Teflon (registered trademark) film, which is wound off from a wind-off roll 13a, and then, is wound up onto a wind-up roll 13b, is interposed between a pressing surface S of each silicone rubber 16cd and the CF film substrate 2.

A cushioning film 14b such as a Teflon (registered trademark) film, which is wound off from a wind-off roll 13c, and then, is wound up onto a wind-up roll 13d, is interposed between a pressing surface S of each concave pressing jig 17aa through 17ac and the TFT film substrate 1.

According to the curved surface bonding apparatus 20c of the present preferred embodiment, significant improvements in production efficiency, the footprint, and the apparatus cost are achieved in manufacturing of curved LCD panels, as in the first and second preferred embodiments. Moreover, since the sealant 3a is heated through both the concave pressing jigs 17aa through 17ac and the convex pressing jigs 16ca through 16cc, the sealant 3a can be more quickly and more uniformly cured than in the curved surface bonding apparatus 20a of the first preferred embodiment.

Moreover, according to the curved surface bonding apparatus 20c of the present preferred embodiment, the pressing surfaces S of the convex pressing jigs 16ca through 16cc made of a rigid body are covered by the silicone rubbers 16cd, the sealant 3a spreads more uniformly between the TFT film substrate 1 and the CF film substrate 2 without being affected by concave portions and convex portions on the substrate surface, as compared to the case where the pressing surfaces are not covered by the silicone rubbers. Moreover, the releasing film 14a, which is wound off from the wind-off roll 13a, is passed between each pressing surface S covered by the silicone rubber 16cd, and (the TFT film substrate 1 and) the CF film substrate 2, and then, is wound up onto the wind-up roll 13b, prevents the pressing surfaces S covered by the silicone rubbers 16cd from directly contacting the surfaces of the TFT film substrate 1 and the CF film substrate 2. This can prevent adhesion of the pressing surfaces S covered by the silicone rubbers 16cd to the surfaces of the TFT film substrate 1 and the CF film substrate 2.

Moreover, according to the curved surface bonding apparatus 20c of the present preferred embodiment, the cushioning film 14b, which is wound off from the wind-off roll 13c, is passed between each pressing surface S of the concave pressing jigs 17aa through 17ac made of a rigid body, and the TFT film substrate 1 (and the CF film substrate 2), and then, is wound up onto the wind-up roll 13d, prevents the pressing surfaces S made of a rigid body from directly contacting the surfaces of the TFT film substrate 1 and the CF film substrate 2. This can prevent generation of scratches to the surfaces of the TFT film substrate 1 and the CF film substrate 2.

Although the pressing jigs capable of switching between two pressing surfaces S or among four pressing surfaces S were shown as an example in the above preferred embodiments, pressing jigs may be formed by using a hexahedron having six pressing surfaces, an octahedron having eight pressing surfaces, or the like.

Moreover, although the above preferred embodiments were described with respect to roll-to-roll manufacturing of LCD panels, the present invention is applicable also to single-substrate manufacturing of LCD panels.

Moreover, although the sealant is preferably made of a resin having either a UV-curable or thermosetting property in the above preferred embodiments, the sealant may be made of a resin having both UV-curable and thermosetting properties. In this case, for example, a sealant having both UV-curable and thermosetting properties can be cured by combining the concave pressing jigs 17*ca* through 17*cc* in the curved surface bonding apparatus 20*b* of the second preferred embodiment and the convex pressing jigs 16*ca* through 16*cc* in the curved surface bonding apparatus 20*c* of the third preferred embodiment.

Moreover, a method for manufacturing an LCD panel by a one-drop-fill (ODF) method was shown as an example in the above preferred embodiments. However, in the present invention, an empty cell may be produced under normal pressure, and then, a liquid crystal material may be injected between the substrates of an LCD panel by a vacuum injection method or the like.

Moreover, although LCD panels were described as an example in the above preferred embodiments, the present invention is not limited to this, and is applicable also to other display panels such as organic EL display panels.

As described above, the present invention is capable of achieving significant improvements in production efficiency, the footprint, and the apparatus cost in manufacturing of curved display panels, and thus, is useful for manufacturing of flexible display panels such as LCD panels and EL display panels.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An apparatus for manufacturing a display panel, comprising:
   a pair of pressing jigs respectively having pressing surfaces that overlap each other; wherein
   a pair of film substrates, each having a display region defined thereon, are molded into a curved shape by holding the pair of film substrates between the respective pressing surfaces of the pair of pressing jigs so that the respective display regions overlap each other with a sealant, which is positioned around the display regions between the pair of film substrates, being interposed therebetween; and
   at least one pressing jig of the pair of pressing jigs has multiple pressing surfaces, which have different radii of curvature from each other, and are switchable with each other.

2. The apparatus of claim 1, wherein in the one pressing jig having multiple pressing surfaces, each of the pressing surfaces is a concave surface.

3. The apparatus of claim 1, wherein multiple pairs of pressing jigs are positioned successively.

4. The apparatus of claim 1, wherein the at least one pressing jig having multiple pressing surfaces is configured so that a pressing surface that contacts the pair of film substrates is switched by rotation of the pressing jig.

5. The apparatus of claim 1, wherein the other pressing jig, which does not have multiple pressing surfaces, is provided so that the pressing surface thereof is deformable to a predetermined radius of curvature.

6. The apparatus of claim 5, wherein the pressing surface of the other pressing jig, which does not have multiple pressing surfaces, is defined by a surface of an inflatable and deflatable airbag.

7. The apparatus of claim 6, wherein the airbag is made of a silicone rubber and the apparatus further comprises a wind-off roll and a wind-up roll arranged to continuously pass a releasing film between the pressing surface defined by the airbag and the pair of film substrates.

8. The apparatus of claim 1, wherein multiple display regions are defined at least along a longitudinal direction in each of the pair of film substrates, and the pair of film substrates are continuously molded by a roll-to-roll method.

9. The apparatus of claim 8, wherein multiple pairs of pressing jigs are positioned successively, and each pair of pressing jigs are arranged so as to be movable back and forth along a traveling direction of the pair of film substrates.

10. The apparatus of claim 1, wherein the at least one pressing jig having multiple pressing surfaces is transparent to UV light, and a UV lamp arranged to cure the sealant is provided on a side, which does not contact the pair of film substrates, of the at least one pressing jig having multiple pressing surfaces.

11. The apparatus of claim 10, wherein a light-shielding wall to prevent UV light from the UV lamp from leaking to outside is arranged around the at least one pressing jig having multiple pressing surfaces.

12. The apparatus of claim 1, wherein at least one pressing jig of the pair of pressing jigs is arranged so as to be able to heat the sealant.

13. The apparatus of claim 1, wherein at least one pressing jig of the pair of pressing jigs is made of a rigid body, and the pressing surface of the pressing jig made of the rigid body is covered by a silicone rubber, and the apparatus further comprises a wind-off roll and a wind-up roll arranged to continuously pass a releasing film between the pressing surface covered by the silicone rubber and the pair of film substrates.

14. The apparatus of claim 1, wherein at least one pressing jig of the pair of pressing jigs is made of a rigid body, and the apparatus further comprises a wind-off roll and a wind-up roll arranged to continuously pass a cushioning film between the pressing surface of the pressing jig made of the rigid body and the pair of film substrates.

15. A method for manufacturing a display panel, wherein a pair of film substrates, each having a display region defined thereon, are molded into a curved shape by holding the pair of film substrates between a pair of pressing jigs respectively having pressing surfaces that overlap each other, so that the respective display regions overlap each other with a sealant, which is positioned around the display regions between the pair of film substrates, being interposed therebetween, and at least one pressing jig of the pair of pressing jigs has multiple pressing surfaces, which have different radii of curvature from each other, and are switchable with each other, the method comprising:
   a first molding step of disposing one of the multiple pressing surfaces at a predetermined position, and molding the pair of film substrate by using the disposed pressing surface; and
   a second molding step of disposing a pressing surface, which is different from the pressing surface used in the first molding step, at a predetermined position, and molding the pair of film substrate by using the disposed pressing surface.

16. The method of claim 15, wherein the display regions are respectively defined at least along a longitudinal direction in the pair of film substrates, and the pair of film substrates are continuously molded by a roll-to-roll method.

17. The method of claim 16, wherein in the pair of film substrates, a slit or a half-cut groove is formed along a width direction in every molding unit that is molded by the pair of molding jigs.

* * * * *